US007068902B2

(12) United States Patent
Gantt et al.

(10) Patent No.: US 7,068,902 B2
(45) Date of Patent: Jun. 27, 2006

(54) RADIATION-CURABLE COATING COMPOSITION FOR OPTICAL FIBERS COMPRISING ALL-IN-ONE OLIGOMERIC SYSTEM

(75) Inventors: Todd Warren Gantt, Catawba, NC (US); Igor V. Khudyakov, Hickory, NC (US); Michael B. Purvis, Hickory, NC (US); Bob J. Overton, Lenior, NC (US); Holly C. Ferguson, Taylorsville, NC (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/486,684

(22) PCT Filed: Aug. 17, 2001

(86) PCT No.: PCT/US01/22599

§ 371 (c)(1),
(2), (4) Date: Aug. 16, 2004

(87) PCT Pub. No.: WO03/016367

PCT Pub. Date: Feb. 27, 2003

(65) Prior Publication Data

US 2005/0047740 A1    Mar. 3, 2005

(51) Int. Cl.
*G02B 6/02*    (2006.01)
*B05D 5/06*    (2006.01)

(52) U.S. Cl. ............... 385/128; 385/123; 385/127; 385/141; 427/163.2

(58) Field of Classification Search ............... 385/123, 385/127, 128, 141; 427/162, 163.2
See application file for complete search history.

(56) References Cited

U.S. PATENT DOCUMENTS

| 4,482,204 | A |   | 11/1984 | Blyler, Jr. et al. |
| 4,789,625 | A | * | 12/1988 | Ellerstein et al. ........... 430/372 |
| 4,889,768 | A |   | 12/1989 | Yokoshima et al. |
| 5,416,880 | A |   | 5/1995  | Edwards |
| 5,532,112 | A | * | 7/1996  | Kohler et al. ............. 430/281.1 |
| 5,696,179 | A | * | 12/1997 | Chawla ....................... 522/90 |
| 5,725,909 | A |   | 3/1998  | Shaw et al. |
| 5,812,725 | A |   | 9/1998  | Petisce |
| 5,907,023 | A |   | 5/1999  | Chawla |

(Continued)

FOREIGN PATENT DOCUMENTS

EP    0104057 A    3/1984

(Continued)

OTHER PUBLICATIONS

Product Bulletin, Urethane Acrylate Oligomers, Sartomer.

*Primary Examiner*—Brian M. Healy
(74) *Attorney, Agent, or Firm*—Sughrue Mion, PLLC

(57) ABSTRACT

A radiation-curable coating composition containing an oligomeric system containing (a) individual oligomers that each contain an oligomeric backbone having chemically tethered thereto one or more radiation-curable components and (b) individual oligomers that each contain an oligomeric backbone having chemically tethered thereto one or more formulation components of a radiation-curable coating composition, wherein each individual oligomer of the group of individual oligomers (a) may be the same as or different from each individual oligomer of the group of individual oligomers (b), and each formulation component is a photoinitiator group, an adhesion promoter group, or a fullerene.

60 Claims, 1 Drawing Sheet

U.S. PATENT DOCUMENTS

| | | |
|---|---|---|
| 5,913,004 A | 6/1999 | Takase et al. |
| 6,018,605 A | 1/2000 | Mills et al. |
| 6,042,943 A | 3/2000 | Levy |
| 6,107,361 A | 8/2000 | Tortorello et al. |
| 6,110,593 A | 8/2000 | Szum et al. |
| 6,121,159 A | 9/2000 | Pasch |
| 6,122,428 A | 9/2000 | Duecker |
| 6,171,698 B1 | 1/2001 | Khudyakov et al. |

FOREIGN PATENT DOCUMENTS

| | | |
|---|---|---|
| EP | 0281941 A | 9/1988 |

\* cited by examiner

RADIATION-CURABLE COATING COMPOSITION FOR OPTICAL FIBERS COMPRISING ALL-IN-ONE OLIGOMERIC SYSTEM

BACKGROUND

The invention relates to optical fiber coating compositions. In particular, the invention relates to radiation-curable primary or secondary optical fiber coating compositions comprising an oligomeric system, wherein individual oligomers of the oligomeric system have formulation components of the coating composition chemically tethered thereto.

Optical fibers made from drawn glass have been used as a reliable transmission medium in telecommunications cables. Glass optical fibers are useful because they have the ability to carry large amounts of information over long distances.

To facilitate these long-distance transmissions, optical fiber waveguides have been coated with plastic compositions of various materials in order to protect the fiber. Optical glass fibers are usually coated with two superposed coatings. The coating which contacts the glass is a relatively soft, primary coating that must satisfactorily adhere to the fiber and be soft enough to resist microbending, especially at low service temperatures. The outer, exposed coating is a much harder secondary coating, and it provides resistance to handling forces, while possessing sufficient flexibility to enable the coated fiber to withstand repeated bending without cracking the coating.

Optical fiber coating compositions, whether primary coating compositions, single coating compositions, or secondary coating compositions, typically comprise, prior to being cured, one or more oligomers, photoinitiator(s) or a photoinitiator system, adhesion promoter(s), and reactive diluent(s). Optical fiber coating compositions also typically comprise flow control additive(s), antioxidant(s), and stabilizer(s).

The coating composition is applied to the optical glass fiber in a liquid state, and is thereafter exposed to actinic radiation to effect cure. Specifically, coatings are applied to the fiber in-line during fiber drawing. As the state of fiber drawing technology has allowed for increased draw speeds to effectuate longer optical fibers, however, the need for coating compositions that can cure at faster rates coincident with the faster draw speeds has become more urgent. Thus, as draw speeds have increased, a need has developed for materials that cure at faster rates while retaining the desired chemical and mechanical properties.

One method of effecting photopolymerization, and thereby curing the coating composition, is to create free radicals. It is known that a photoinitiator(s) or photoinitiator system may be included in a coating composition in order to generate free radicals upon the absorption of light, e.g. ultraviolet light. When the photoinitiator molecule absorbs radiation, electrons are promoted to higher energy levels in the molecule and the molecule becomes unstable, i.e. very reactive. So, for example, a photoinitiator molecule becomes electronically excited upon the absorption of light and undergoes alpha-cleavage to form two free radicals. One or both of these free radicals are capable of initiating polymerization. Other more complicated processes employ photoinitiator systems, which include co-initiators, from which a photoinitiator molecule may abstract a hydrogen (electron) to form a radical pair. Amines are typical co-initiators.

Although the prior art discloses various curable coating compositions with photoinitiators or a photoinitiator system dissolved therein, the effectiveness of the photoinitiators has not always been maximized. For example, problems sometimes exist with initiating the cure. In addition, free residual photoinitiator has a tendency to leach from the cured composition, thereby deteriorating the coating. Still further, photoinitiators may sometimes remain as low molecular weight inclusions in the cured polymer, thereby reducing the maximum physical properties obtainable in the cured system by adversely affecting properties such as hardness, abrasion resistance, etc.

A similar problem exists for the inclusion of one or more adhesion promoters in a coating composition. In the case of primary coating compositions, it is important that the cured coating adhere well to the glass cladding. Otherwise, the cured coating will have a tendency to delaminate from the glass fiber. Although the prior art discloses various curable coating compositions with adhesion promoters dissolved therein, the effectiveness of the adhesion promoters has not always been maximized. Thus, a need still exists for adhesion promoters that provide even stronger adhesion to glass at relatively low concentrations.

SUMMARY

A radiation-curable coating composition comprising an oligomeric system comprising (a) individual oligomers that each comprise an oligomeric backbone having chemically tethered thereto one or more radiation-curable components and (b) individual oligomers that each comprise an oligomeric backbone having chemically tethered thereto one or more formulation components of a radiation-curable coating composition, wherein each individual oligomer of the group of individual oligomers (a) may be the same as or different from each individual oligomer of the group of individual oligomers (b), and each formulation component is selected from the group consisting of a photoinitiator group, an adhesion promoter group, and a fullerene.

Each individual oligomer of the group of individual oligomers (a) and each individual oligomer of the group of individual oligomers (b) may be independently represented by the following structure:

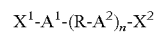

wherein $X^1$ and $X^2$ are end groups, which may be the same or different, $A^1$ and $A^2$ are linking groups, which may be the same or different, R is a backbone group, $n \geq 1$, and the end groups $X^1$ and $X^2$ are independently selected from the group consisting of a photoinitiator group, an adhesion promoter group, a radiation-curable end group, and a fullerene, provided that, in the case of an individual oligomer of the group of individual oligomers (a), at least one of end groups $X^1$ and $X^2$ is a radiation-curable end group, and in the case of an individual oligomer of the group of individual oligomers (b), at least one of end groups $X^1$ and $X^2$ is selected from the group consisting of a photoinitiator group, an adhesion promoter group, and a fullerene.

DETAILED DESCRIPTION

Figure 1:
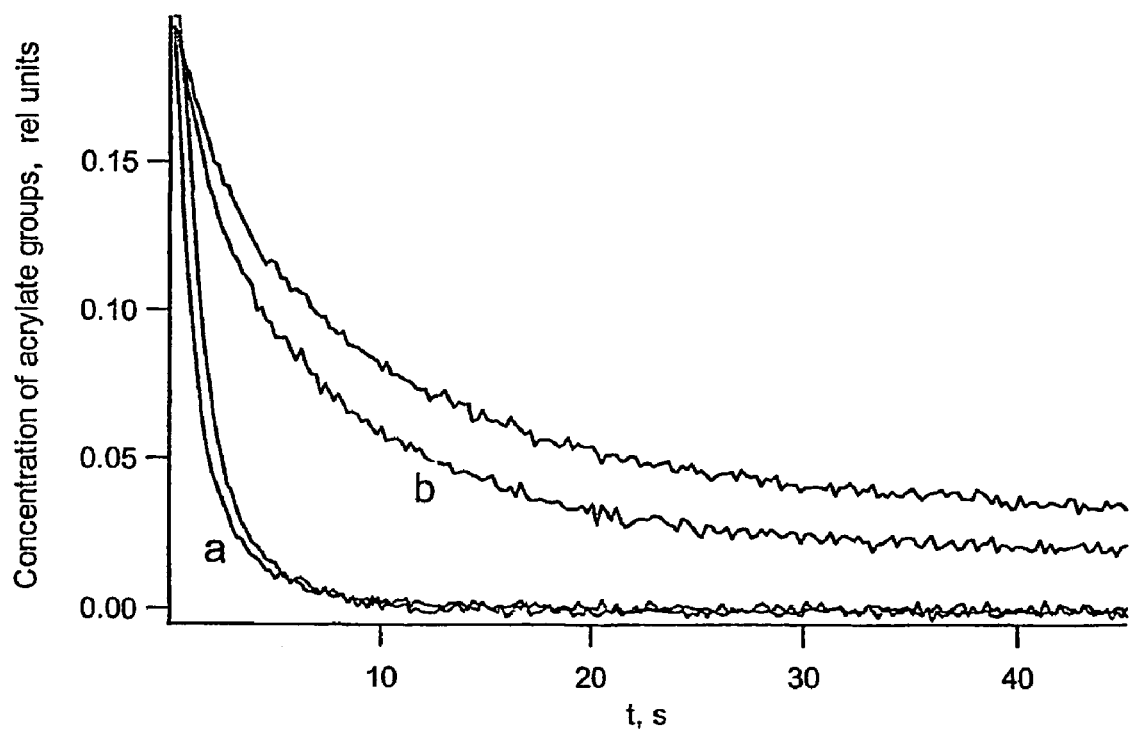
FIG. 1 is a graph comparing, in terms of concentration of acrylate groups versus time, (a) the prinary coating composition of inventive Example 4 and (b) the primary coating composition of Comparative Example 1.

The present invention provides a radiation-curable oligomeric system comprising individual oligomers having chemically tethered thereto formulation components of a coating composition, such as photoinitiators and/or adhesion promoters and/or fullerenes. The present oligomeric system is especially suited for use as either a primary or secondary radiation-curable optical fiber coating composition that does not require the presence of separate photoinitiator and/or separate adhesion promoter, i. e. the coating composition does not require photoinitiator or adhesion promoter that is not chemically tethered to an oligomer backbone.

For this invention, a group or moiety that is "chemically tethered thereto" means a group or moiety that is linked covalently to, for example, an oligomeric backbone. A general reference to "individual oligomers of the oligomeric system" is intended to encompass both the group of individual oligomers (a) and the group of individual oligomers (b). In addition, a polyfunctional compound is intended to mean a compound having 2 or more functionalities. Finally, an isocyanate-reactive compound is defined as a compound that is capable of reacting with an isocyanate, for example, a compound that is hydroxy-, thiol-, or amino-functionalized.

The term "primary coating" is defined as that coating which directly contacts the glass portion of the optical fiber. The uncured primary coating should be liquid at room temperature. The uncured primary coating should have a viscosity suitable for high speed processing, and the uncured primary coating should have a high cure speed. The cured primary coating should exhibit good adhesion to glass to prevent premature delamination of the coating from the glass portion of the optical fiber. The cured primary coating should have a low modulus at lower temperatures to minimize the effects of microbend attenuation due to small stresses on the optical fiber itself.

The term "secondary coating" is defined as the coating which covers the primary coating on the optical fiber. The cured secondary coating should have sufficient modulus to give impact resistance and to provide a protective barrier, and give tensile strength to the optical fiber. The cured secondary coating should exhibit little physical change over a wide temperature range, good resistance to water and solvent absorption and have good color stability.

The uncured liquid primary or secondary coating composition should have a sufficiently low viscosity that the composition will be easily applied to form a continuous protective coating on the glass fibers. Examples of such viscosities include from about 10,000 to about 100,000 inPa s (45–50° C.), e.g., from about 20,000 to about 80,000 mPa s (45–50° C.). There is no particular limitation on viscosity, however, and it may be adjusted to a given application by known methods. For example, viscosity may be adjusted depending on the type of optical fiber material being formulated and the method of application.

Generally, the thickness of the cured primary or secondary coating will depend on the intended use of the optical fiber, although thicknesses of about 20 to 35 microns, and in particular thicknesses of about 25 to 30 microns, are suitable.

When used as primary coatings, cured coatings in accordance with the present invention may have a glass transition temperature ($T_g$) of from about –60° C. to about –10° C., for example, from about –50° C. to about –30° C., and, e.g., about –40° C., an low modulus of elasticity of from about 0.5 MPa to about 3.0 MPa at room temperature (20° C.) and 50% relative humidity, for example, from about 1.0 MPa to about 2.0 MPa and, e.g., about 1.5 MPa.

When utilized as a secondary coating, cured coatings in accordance with the present invention may have a glass transition temperature ($T_g$ of from about 35 C. to about 55° C., for example, about 45° C. A cured secondary coating usually has a modulus of elasticity of from about 30 to about 60 MPa at around 80° C. and 50% relative humidity, for example, from about 35 to about 55 MPa, and, e.g., about 45 MPa.

Within the present radiation-curable oligomeric system, each individual oligomer of the group of individual oligomers (a) and each individual oligomer of the group of individual oligomers (b) may independently comprise (i) a backbone containing one or more types of repeating backbone groups, (ii) at least two linking groups, and (iii) at least two end groups. The repeating backbone group(s) of the oligomeric backbone may provide the oligomer with suitable mechanical properties upon cure. The linking groups, which may be the same or different, may (a) link the backbone to the end groups, or (b) link repeating groups of the backbone to themselves.

The end groups, which may be the same or different, are independently selected from the group consisting of a photoinitiator group, an adhesion promoter group, a radiation-curable group, and a fullerene. The end groups may provide the individual oligomers with, for example, a cure mechanism, a photoinitiating functionality, i.e. the end group may function as a photoinitiator by generating free radicals upon exposure to a sufficient amount of actinic radiation, or an adhesion- promoting functionality. In the case of an individual oligomer of the group of individual oligomers (a), at least one end group is a radiation-curable end group. In the case of an individual oligomer of the group of individual oligomers (b), at least one end group is selected from the group consisting of a photoinitiator group, an adhesion promoter group, and a fullerene.

The individual oligomers (a) and individual oligomers (b) may be prepared together in a single, one-pot synthesis. The preparation of the individual oligomers will result in the present oligomeric system, which will have a statistical distribution of oligomers differentiated at least by particular combinations of end groups.

Most, or a substantial majority, of the combined total amount of individual oligomers (a) and individual oligomers (b) in the oligomeric system will have at least one radiation-curable end group. For example, most, or a substantial majority, of the combined total amount of individual oligomers (a) and individual oligomers (b) will have (1) an adhesion promoting end group and a radiation-curable end group, (2) a photoinitiating end group and a radiation-curable end group, (3) a fullerene end group and'a radiation-curable end group, or (4) two radiation-curable end groups. In one embodiment of the invention, the phrase "most, or a substantial majority" is intended to mean that at least 90% of the individual oligomers, based on the combined total amount of individual oligomers (a) and individual oligomers (b) in the oligomeric system, will contain at least one radiation-curable end-group.

Furthermore, it is to be understood that cases where individual oligomers of the oligomeric system have (1) an adhesion promoting end group and a radiation-curable end group, (2) a photoinitiating end group and a radiation-curable end group, or (3) a fullerene end group and a radiation-curable end group, i.e. only one radiation-curable end group, are cases that are examples of embodiments wherein individual oligomers of the group of individual oligomers (a) may be the same as individual oligomers of the group of individual oligomers (b).

A minor amount of the combined total amount of individual oligomers (a) and individual oligomers (b) in the oligomeric system will not have any radiation-curable end groups, and may instead have, for example, (1) a photoinitiating end group and an adhesion promoting end group, (2) two photoinitiating end groups, (3) two adhesion promoting end groups, or (4) a fullerene end group and either a photoinitiating or adhesion-promoting end group. For example, in one embodiment of the invention, at most 10% of the individual oligomers, based on the combined total amount of individual oligomers (a) and individual oligomers (b) in the oligomeric system, will contain a photoinitiator end group and an adhesion promoter end group, two photoinitiator end groups, two adhesion promoter end groups, or a fullerene end group and either a photoinitiator or adhesion promoter end group.

Each individual oligomer of the radiation-curable oligomeric system, whether it be an individual oligomer of the group of individual oligomers (a) or an individual oligomer of the group of individual oligomers (b), thus comprises the three basic components (backbone, linking, and end group) discussed above, and may be independently represented by a structure such as, for example:

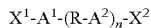

wherein $X^1$ and $X^2$ are end groups, which may be the same or different, $A^1$ and $A^2$ are linking groups, which may be the same or different, R is a backbone group, and $n \geq 1$, provided that, in the case of an individual oligomer of the group of individual oligomers (a), at least one of end groups $X^1$ and $X^2$ is a radiation-curable end group, and in the case of an individual oligomer of the group of individual oligomers (b), at least one of end groups $X^1$ and $X^2$ is selected from the group consisting of a photoinitiator group, an adhesion promoter group, and a fullerene.

In the above structure, R is a backbone group and $A^1$ and $A^2$ are linking groups, but it will be readily understood by one of ordinary skill in the art that the present oligomeric backbone is considered to encompass the entire $-A^1-(R-A^2)-$ structure when n is 1, and the entire $-A^1-R-A^2-(R-A^2)_{n-1}-$ structure when n is greater than 1. It is with this understanding that the present oligomeric system is said to comprise (a) individual oligomers that each comprise an oligomeric backbone having chemically tethered thereto one or more radiation-curable components and (b) individual oligomers that each comprise an oligomeric backbone having chemically tethered thereto one or more formulation components of a radiation-curable coating composition.

In the above structure, both A and R are difunctional, but individual oligomers of the present oligomeric system may also be prepared from tri- or greater functional A and R groups in order to provide branching and the capacity for an individual oligomer with three or more end groups, i.e. an individual oligomer having end groups $X^1$, $X^2$, $X^3$, etc.

On average, n is from about 2 to about 50, for example from about 2 to about 25, e.g. from about 2 to about 5.

Each individual oligomer of the group of individual oligomers (a) and each individual oligomer of the group of individual oligomers (b) may be prepared together in a single, one pot synthesis from, for example, (i) at least one ingredient which reacts to provide the backbone group R, (ii) at least one ingredient which reacts to provide the linking group(s) A, and (iii) at least one ingredient which reacts to provide the end group(s) X.

It is to be understood that the phrase "lining group(s) A" is intended to encompass both a linking group A, wherein $A = A^1 = A^2$, and linking groups $A^1$ and $A^2$, wherein $A^1 \neq A^2$. Likewise, the phrase "end group(s) X" is intended to encompass both an end group X, wherein $X = X^1 = X^2$, and end groups $X^1$ and $X^2$, wherein $X^1 \neq X^2$.

Linking group(s) A may include a urethane, thiourethane, or urea group which is formed by the reaction of an hydroxyl, thiol, and amino group, respectively, with a polyfunctional isocyanate. For example, a urethane linking group may be formed by the reaction of a polyfunctional isocyanate with an hydroxy functionalized compound. Other examples of a linking group may include a carbonate, ether, or ester group. A urethane, thiourethane, or urea linking group, and especially a urethane linking group, is particularly suitable for use in the present coating composition.

In the case where the linking group(s) A is a urethane linking group, individual oligomers of the present oligomeric system may be prepared together in a single, one-pot synthesis from, for example, (i) at least one polyhydroxy functionalized compound that reacts to provide the backbone group R, (ii) at least one polyfunctional isocyanate, and (iii) at least one hydroxy-, thiol-, amino-, or isocyanofunctionalized compound that reacts to provide the end group(s) X.

Using as an example the particular case of a urethane linking group that is formed by the reaction of (i) a hydroxyl-functionalized compound ($COMP_1$-OH) with one end of a diisocyanate (OCN-$COMP_3$-NCO), and (ii) a second hydroxyl-functionalized compound ($COMP_2$-OH) with the second end of the same diisocyanate, it will be readily understood by one of ordinary skill in the art that the term urethane linking group is intended to encompass the —U—$COMP_3$—U— portion of the $COMP_1$-U-$COMP_3$-U-$COMP_2$ reaction product, wherein U is the urethane moiety —O—(C=O)—NH. For example, when the diisocyanate is isophorone diisocyanate, -$COMP_3$- is the isophorone residue of isophorone diisocyanate.

An example of the (i) at least one polyhydroxy compound that reacts to provide the backbone group R is a polyol, especially a diol, that may be represented by a structure such as, for example, HO—R—OH. The polyol may have a number average molecular weight of from about 50 to about 10,000, or in the particular case of a diol, from about 50 to about 5,000. Examples of representative polyols include polyether polyol, polyester polyol, polycarbonate polyol, and hydrocarbon diol. It can be readily understood by one skilled in the art that a polyether polyol will react to provide a polyether-backboned oligomer, a polyester polyol will react to provide a polyester-backboned oligomer, etc., or that the use of mixtures of polyols, such as a mixture of polyether and polyester polyol will provide a polyether/polyester-backboned oligomer.

Polyether polyols may be homopolymers or copolymers of alkylene oxides including $C_2$ to $C_5$ alkylene oxides, such as, for example, ethylene oxide, propylene oxide, butylene oxide, tetrahydrofuran, and 3-methyltetrahydrofuran; homopolymers or copolymers of the above alkylene oxides obtained by using, as an initiator, $C_{14}$ to $C_{40}$ polyols, such as 12-hydroxystearyl alcohol and hydrogenated dimerdiol; and adducts of the above alkylene oxides with bisphenol-A or hydrogenated bisphenol-A.

Polyester polyols may be, for example, addition reaction products of a diol component and a lactone, reaction products of the diol component and a polyvalent carboxylic acid, and addition reaction products of three components, including the diol component, a dibasic acid, and the lactone. The diol component may be $C_2$ to $C_{40}$ aliphatic diols with a low molecular weight such as ethylene glycol, propylene glycol, diethylene glycol, dipropylene glycol, 1,4butanediol, 1,5-pentanediol, 3-methyl-1,5-pentanediol, 2,4-ethyl-1,5-pentanediol, 1,6hexane glycol, neopentyl glycol, 1,9-nonanediol, 1,10-decanediol, 12-hydroxystearyl alcohol, and hydrogenated dimerdiol; and an alkylene oxide adduct of bisphenol-A. The lactone may be, for example, epsilon-caprolactone, delta-valerolactone, and beta-methyl-delta-valerolactone. The polyvalent carboxylic acid may be, for example, aliphatic dicarboxylic acids such as succinic acid, adipic acid, azelaic acid, sebacic acid, and dodecanedioic acid; and aromatic dicarboxylic acids such as hexahydrophthalic acid, tetrahydrophthalic acid, phthalic acid, isophthalic acid, and terephthalic acid.

Polycarbonate polyols may be, for example, polycarbonate diols which are obtainable by a reaction of a short chain dialkylcarbonate and a component selected from aforementioned polyether polyols, polyester polyols and diol components such as 2-methylpropanediol, dipropylene glycol, 1,4-butanediol, 1,6-hexanediol, 3-methyl-1,5-pentanediol, neopentyl glycol, 1,5-octanediol, and 1,4-bis-(hydroxymethyl)cyclohexane. The short chain dialkylcarbonate may be $C_1$–$C_4$ alkylcarbonates such as, for example, dimethylcarbonate and diethylcarbonate.

Hydrocarbon diols, which may be generally defined as low molecular weight alkane diols having a molecular weight of from about 50 to about 500, maybe used as the at least one polyhydroxy compound that reacts to provide the backbone group R. Examples of suitable hydrocarbon diols include ethylene glycol, propylene glycol, tripropylene glycol, 1,3- or 1,4-butanediol, neopentyl glycol, 1,6-hexanediol, 1,9-nonanediol, and 1,10-decanediol. Higher fatty acid diols and higher hydrocarbon diols such as castor oil, coconut oil, monomyristins (1-monomyristin and 2-monomyristin), monopalmitins (1-monopalmitin and 2-monopalmitin), monostearins (1-monostearin and 2-monostearin), monooleins (1-monoolein and 2-monoolein), 9,10-dioxystearic acid, 12-hydroxyricinoleyl alcohol, 12-hydroxystearyl alcohol, 1,16-hexadecanediol, 1,21-henicosanediol, chimyl alcohol, batyl alcohol, selachyl alcohol, and dimeric acid diol may also be employed.

When using a low molecular weight alkane diol as the polyhydroxy compound that reacts to provide the backbone group R, then each individual oligomer of the group of individual oligomers (a) and each individual oligomer of the group of individual oligomers (b) may be independently represented by a structure such as, for example:

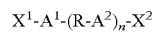

$X^1$-$A^1$-$(R$-$A^2)_n$-$X^2$ wherein n, on average, is from about 10 to about 50.

If a diol is used as the compound that reacts to provide the backbone group R, it may be added in amounts of from about 25 wt % to about 85 wt % to the single, one-pot preparation of the present oligomeric system, based upon the total weight of all components employed in the preparation of the oligomeric system.

Examples of the (ii) at least one polyfinctional isocyanate include diisocyanates, triisocyanates, and higher order polyisocyanates which can provide the linking group. The polyisocyanate used to prepare the individual oligomers of the oligomeric system may be, for example, an aromatic polyisocyanate, an aromatic aliphatic polyisocyanate, an alicyclic polyisocyanate, or an aliphatic polyisocyanate. Of polyisocyanates, diisocyanates are preferred.

Examples of the aromatic polyisocyanates include diisocyanates such as m-phenylene diisocyanate, p-phenylene diisocyanate, 4,4'-diphenyl diisocyanate, 1,5-naphthalene diisocyanate, 4,4'-diphenylmethane diisocyanate, 2,4- or 2,6-tolylene diisocyanate, 4,4'-toluidine diisocyanate, and 4,4'-diphenyl ether diisocyanate; and polyisocyanates such as triphenylmethane-4,4',4"-triisocyanate, 1,3,5-triisocyanatebenzene, 2,4,6-triisocyanatetoluene, and 4,4'-diphenylmethane-2,2',5,5'-tetraisocyanate.

Examples of the aromatic aliphatic polyisocyanates include diisocyanates such as 1,3- or 1,4-xylylene diisocyanate or mixtures thereof and 1,3- or 1,4-bis(1-isocyanate-1-methylethyl)benzene or mixtures thereof; and polyisocyanates such as 1,3,5-triisocyanatemethylbenzene.

Examples of the alicyclic polyisocyanates include diisocyanates such as 1,3-cyclopentene diisocyanate, 1,4-cyclohexane diisocyanate, 1,3-cyclohexane diisocyanate, 3-isocyanatemethyl-3,5,5-trimethylcyclohexyl isocyanate (isophorone diisocyanate or IPDI), 4,4'-methylenebis(cyclohexyl isocyanate) ($H_{12}MDI$ or DESMODUR W), methyl-2,4-cyclohexane diisocyanate, methyl-2,6-cyclohexane diisocyanate, and 1,3- or 1,4-bis (isocyanatemethyl)cyclohexane; and polyisocyanates such as 1,3,5-triisocyanatecyclohexane, 1,3,5-trimethyllisocyanatecyclohexane, 2-(3-isocyanatepropyl)-2,5-di(isocyanatemethyl)-bicyclo(2.2.1)heptane, 2-(3-isocyanatepropyl)-2,6-di(isocyanatemethyl)-bicyclo(2.2.1) heptane, 3-(3-isocyanatepropyl)-2,5-di(isocyanatemethyl)-bicyclo(2.2.1)heptane, 5-(2-isocyanateethyl)-2-isocyanatemethyl-3-(3-isocyanatepropyl)-bicyclo(2.2.1) heptane, 6-(2-isocyanateethyl)-2-isocyanatemethyl-3-(3-isocyanatepropyl)-bicyclo(2.2.1)heptane, 5-(2-isocyanateethyl)-2-isocyanatemethyl-2-(3-isocyanatepropyl)-bicyclo(2.2.1)heptane, and 6-(2-isocyanateethyl)-2-isocyanatemethyl-2-(3-isocyanatepropyl)-bicyclo(2.2.1)heptane.

Examples of the aliphatic polyisocyanates include diisocyanates such as trimethylene diisocyatnate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, and 2,6-diisocyanatemethylcaproate; and polyisocyanates such as lysine ester triisocyanate, 1,4,8-triisocyanateoctane, 1,6,11-triisocyanateundecane, 1,8-diisocyanate-4-isocyanatemethyloctane, 1,3,6-triisocyanatehexane, and 2,5,7-trimethyl-1,8-isocyanate-5-isocyanatemethyloctane.

The majority of the polyisocyanate compounds mentioned above, including DESMODUR W, are available from Bayer of Pittsburgh, Pa.

Moreover, derivatives from the above polyisocyanates can be used. Examples of the derivatives include a dimer, a trimer, biuret, allophanate, carbodiimide, polymethylenepolyphenyl polyisocyanate (referred to as crude MDI or polymeric MDI), crude TDL and an adduct of an isocyanate compound and a polyol with a low molecular weight.

A diisocyanate may be added in amounts of from about 5 wt % to about 50 wt % to the single, one-pot preparation of the present oligomeric system, based upon the total weight of all components employed in the preparation of the oligomeric system.

Examples of the (iii) at least one hydroxy-, thiol-, amino-, or isocyano-functionalized compound that reacts to provide the end group(s) X include (a) an hydroxy-, thiol-, or amino-functionalized photoinitiator, i.e. an isocyanate-reactive photoinitiator, (b) an hydroxy-, thiol-, amino-, or isocyano-functionalized adhesion promoter, (c) an hydroxy-, thiol-, or amino-functionalized radiation-curable compound, i.e. an isocyanate-reactive radiation-curable compound, and (d) an hydroxy-, thiol-, or amino-functionalized fullerene, ie. an isocyanate-reactive fullerene.

The chemical nature of the photoinitiator that reacts to provide the photoinitiator end group X is not narrowly limited, provided that it has a functional component that may react to form the linking group A, and thereby covalently tether the remainder of the photoinitiator group, i.e. the photoinitiating component of the photoinitiator group, to the present oligomeric backbone. For example, the isocyanate-reactive photoinitiator may be benzoin, 1-hydroxycyclohexyl phenyl ketone (IRGACURE 184), 2-hydroxy-2-methyl-1-phenyl propan-1-one (DAROCUR 1173), 1-{4-(2-hydroxyethoxy)phenyl}-2-hydroxy-2-methylpropan-1-one (IRGACURE 2959), or 2-hydroxythioxanthen-9-one (available from ChemFirst Fine Chemical of Pascagoula, Miss.). DAROCUR and IRGACURE product lines are available from Ciba Additives of Tarrytown, N.Y.

It must be noted that in the case of IRGACURE 2959, which is dihydroxy- functionalized, one of the hydroxyl groups is a primary OH, whereas the other hydroxyl group is a tertiary OH. Because the reactivity of the primary OH dwarfs the reactivity of the tertiary OH, it is considered that the amount of IRGACURE 2959 reacting via the tertiary OH group is negligible, i.e. virtually nil.

A photoinitiator that does not initially contain the necessary functional component to tether itself to the present oligomeric backbone through the formation of a linking group A may be separately prepared prior to inclusion in the preparation of the oligomeric system by chemically inserting, for example, an isocyanate-reactive functionality onto a photoinitiator which lacks such a functionality. For example, the photoinitiator may be brominated in free-radical bromination with a subsequent Williamson synthesis of the brominated product and a diol.

Examples of a photoinitiator which may be chemically converted to an isocyanate-reactive photoinitiator include acyl phosphine oxide photoinitiators, such as a benzoyl diaryl phosphine oxide photoinitiator. Examples of a benzoyl diaryl phosphine oxide photoinitiator include: bis(2,4,6-trimethylbenzoyl)phenylphosphine oxide (IRGACURE 819), (2,4,6-trimethylbenzoyl)diphenylphosphine oxide (LUCERIN TPO, which is available from BASF of Parsippany, N.J.), bis(2,6-dimethoxybenzoyl)-2,4,4-trimethylpentylphosphine oxide, which is a first component (25 wt %) of IRGACURE 1700. The second component (75 wt %) of IRGACURE 1700 is 2-hydroxy-2-methyl-1-phenylpropan-1-one.

A suitable isocyanate-reactive photoinitiator may be represented by one of the following general structural formulas (1) and (2).

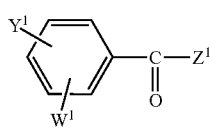
(1)

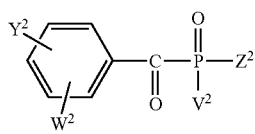
(2)

In formulas (1) and (2), $Y^1$, $Z^1$, $Y^2$, $Z^2$, and $V^2$ may be independently selected from the group of substituents consisting of alkyl and aromatic substituents. Each of substituents $Y^1$, $Z^1$, $Y^2$, $Z^2$, and $V^2$ may have its own substituent(s). $W^1$ and $W^2$ represent the hydroxy-, thiol-, or amino-functionalized component of the isocyanate-reactive photoinitiator that reacts to form the linking group A, and thereby covalently tethers the remainder of the photoinitiator group, i.e. the photoinitiating component of the photoinitiator group, to the oligomer backbone. For example, $W^1$ and $W^2$ may themselves be a hydroxyl group, a thiol group, or an amino primary or secondary) group, or $W^1$ and $W^2$ may be a substituent group, such as an alkyl or aromatic substituent group, that is itself substituted with a hydroxyl group, a thiol group, or an amino (primary or secondary) group to provide isocyanate-reactive functionality.

In certain embodiments of the invention, it may be desirable to employ an isocyanate-reactive photoinitiator that benefits from the presence of a co-initiator, from which the photoinitiator may abstract a hydrogen (electron) to form a radical pair. Amines are typical co-initiators. An example of a photoinitiator that benefits from the presence of a co-initiator group is 3-hydroxybenzophenone. 2-hydroxythioxanthen-9-one is another example of a photoinitiator that benefits from the presence of a co-initiator, although in the case of 2-hydroxythioxanthen-9-one, a co-initiator is not necessary.

An isocyanate-reactive photoinitiator that may benefit from the presence of a co-initiator may be represented by the following general structural formula (3).

(3)

In structural formula (3), one of $Z^3$ and $V^3$ is selected from the group of substituents consisting of alkyl and aromatic substituents, wherein each substituent may have its own substituent(s), and one of $Z^3$ and $V^3$ represents the hydroxy-, thiol-, or amino-functionalized component of the isocyanate-reactive photoinitiator that reacts to form the linking group A, and thereby covalently tethers the remainder of the photoinitiator group, i.e. the photoinitiating component of the photoinitiator group, to the present oligomeric backbone. In other words, one of $Z^3$ and $V^3$ may be a hydroxyl group, a thiol group, or an amino (primary or secondary) group, or one of $Z^3$ and $V^3$ may be a substituent group, such as an alkyl or aromatic substituent group, that is itself substituted with a hydroxyl group, a thiol group, or an amino (primary or secondary) group to provide isocyanate-reactive functionality.

Preferably, the co-initiator is chemically tethered to the oligomeric backbone of an individual oligomer of the present oligomeric system. Therefore, it will be readily understood by one of ordinary skill in the art that the co-initiator may be a functionalized co-initiator that is able to react to form an end group X and a linking group A, and thereby covalently tether the remainder of the co-initiator to the oligomeric backbone of an individual oligomer of the group of individual oligomers (b), ie. the co-initiator is, for example, an isocyanate-reactive co-initiator.

Thus, in the case where individual oligomers of the group of individual oligomers (b) have one or both of $X^1$ and $X^2$ equal to a photoinitiator group that benefits from the presence of a co-initiator, the group of individual oligomers (b) also comprises an effective amount of individual oligomers that have one or both of $X^1$ and $X^2$ equal to a co-initiator group. The amount of functionalized co-initiator to be added during the preparation of the oligomeric system will directly depend on the addition amount of photoinitiator that benefits from the presence of co-initiator.

Furthermore, it should be noted that it is possible to employ an isocyano-functionalized photoinitiator, rather than an isocyanate-reactive photoinitiator. In the case of an isocyano-functionalized photoinitiator, the backbone group R, the linking group A, and one end group X may be provided by the reaction of an isocyano-functionalized photoinitiator with, for example, a diol of the formula HO—R—OH. The reaction of the cyano moiety (N=C=O) of the photoinitiator with the hydroxyl moiety of the diol will provide a photoinitiator end group X linked to the backbone group R via the urethane linking group A.

A coating composition that cures in a very efficient manner may be provided by preparing the present coating composition that includes an oligomeric system comprising individual oligomers having chemically tethered thereto a photoinitiator group, i.e. a photoinitiator end group X. Functionalized photoinitiator may be added in amounts of from about 0.1 wt % to about 30 wt % to the single, one-pot preparation of the present oligomeric system, based upon the total weight of all components employed in the preparation of the oligomeric system.

The chemical nature of the adhesion promoter that reacts to provide the adhesion promoter group X is not narrowly limited, provided that it has a functional component that may react to form the linking group A, and thereby covalently tether the remainder of the adhesion promoter group, i.e. the adhesion promoting component of the adhesion promoter group, to the present oligomeric backbone. Examples of the hydroxy-, thiol-, amino-, or isocyano-functionalized adhesion promoter include hydroxy-, thiol-, amino-, or isocyano-functionalized alkoxysilanes, especially an hydroxy-, thiol-, amino-, or isocyano-functionalized dialkoxysilane, or an hydroxy-, thiol-, amino-, or isocyano-functionalized trialkoxysilane. Specific examples of the hydroxy-, thiol-, amino-, or isocyano-functionalized adhesion promoter include N-beta(aminoethyl)-gamma-aminopropylmethyldimethoxysilane, N-beta(aminoethyl)-gamma-aminopropyltrimethoxysilane, and isocyanopropyltriethoxysilane.

In the case of an isocyano-functionalized adhesion promoter, such as isocyanopropyltriethoxysilane, the backbone group R, the linking group A, and one end group X may be provided by the reaction of, for example, isocyanopropyltriethoxysilane with a diol of the formula HO—R—OH. The reaction of the cyano moiety (N=C=O) of the adhesion promoter with the hydroxyl moiety of the diol will provide an adhesion promoter end group X linked to the backbone group R via the urethane linking group A.

A primary coating composition having a very strong adhesion to glass may be provided by preparing the present coating composition that includes an oligomeric system comprising individual oligomers having chemically tethered thereto an adhesion promoter end group. Functionalized adhesion promoter may be added in amounts of from 0 wt % to about 10 wt % to the single, one-pot preparation of the present oligomeric system, based upon the total weight of all components employed in the preparation of the oligomeric system.

The chemical nature of the radiation-curable compound that reacts to provide the radiation-curable end group X is not narrowly limited, provided that it has a functional component that may react to form the linking group A, and thereby covalently tether the remainder of the radiation-curable group, i.e. the radiation- curable moiety of the radiation-curable group, to the present oligomeric backbone.

In the case where the linking group A is a urethane linking group, the radiation-curable compound may be any hydroxy-, thiol-, or amino-functionalized, i.e. any isocyanate-reactive, compound capable of polymerizing under the influence of, for example, ultraviolet or electron-beam radiation. One type of radiation-curable functionality is, for example, ethylenic unsaturation, which in general is polymerized through radical polymerization, but can also be polymerized through cationic polymerization. Groups containing (meth)acrylate, styrene, vinylether, vinyl ester, N-substituted acrylamide, N-vinyl amide, maleate ester, and fumarate ester moieties are examples of a suitable radiation-curable compound.

Preferred isocyanate-reactive radiation-curable compounds are hydroxy-functional (meth)acrylates. Examples of hydroxy-functional (meth)acrylates include 2-hydroxyethyl (meth)acrylate, 2-hydroxypropyl (meth)acrylate, 2-hydroxybutyl (meth)acrylate, 4-hydroxybutyl (meth)acrylate, pentanediol mono(meth)acrylate, 2- hydroxy-3-phenyloxypropyl (meth)acrylate, 2-hydroxyalkyl(meth)acryloyl phosphate, 4-hydroxycyclohexyl (meth)acrylate, cyclohexanedimethanol mono(meth)acrylate, neopentyl glycol mono (meth)acrylate, trimethylolpropane di(meth)acrylate, and pentaerythritol tri(meth)acrylate. Additional examples include compounds which are obtainable by an addition reaction of a glycidyl group-containing compound and a (meth)acrylic acid, such as alkyl glycidyl ether and glycidyl (meth)acrylate. The above hydroxyl group-containing (meth)acrylates may be used alone or in combination of two or more. The expression (meth)acrylate connotes groups which are either acrylates or methacrylates.

Another type of radiation-curable functionality generally used is provided by, for example, epoxy groups, or thiol-ene or amine-ene systems. Epoxy groups, in general, can be polymerized through cationic polymerization, whereas the thiol-ene and amine-ene systems are usually polymerized through radical polymerization. The epoxy groups may be, for example, homopolymerized. In the thiol-ene and amine-ene systems, for example, polymerization may occur between a group containing allylic unsaturation and a group containing a tertiary amine or thiol.

It will be readily understood by one of ordinary skill in the art that in the case where the linking group A is a linking group other than a urethane linking group, the radiation-curable compound may include any compound capable of polymerizing under the influence of, for example, ultraviolet or electron-beam radiation, e.g. any of the compounds mentioned above, that may react to form the radiation-curable end group X, and has been functionalized to react to form the particular linking group A other than a urethane linking group.

Functionalized radiation-curable compounds may be added in amounts of from about 5 wt % to about 60 wt % to the single, one-pot preparation of the present oligomeric system, based upon the total weight of all components employed in the preparation of the oligomeric system.

The chemical nature of the fillerene that reacts to provide the fullerene end group X is not narrowly limited, provided that it has a functional component that may react to form the linking group A, and thereby covalently tether the remainder of the fullerene group, i.e. the fullerene moiety of the fullerene group, to the present oligomeric backbone.

In the case where the linking group A is a urethane linking group, examples of the hydroxy-, thiol-, or amino-functionalized, i.e. isocyanate-reactive, fullerene include hydroxylated or polyhydroxylated fullerenes, poly(amino) fullerenes, poly(aminohydroxy) fullerenes, poly(amino-hydroxyacetoxy) fullerenes, poly(aminohydroxytrifluoroacetoxy) fullerenes, poly(nitrohydroxy) fullerenes, and poly(aminoacetamino) fullerenes. Hydroxylated fullerenes are preferred. U.S. Pat. No. No. 5,177,248 to Chiang, et al. provides a complete discussion on functionalized fullerenes, and a method of preparing functionalized fullerenes, including hydroxylated fillerenes.

The presence within the oligomeric system of individual oligomers having a fullerene end group may accelerate the cure speed of the composition, and may allow for tailoring of the mechanical properties of the present coating composition. For example, with the increasing addition of fullerenes to liquid, radiation curable compositions, coating toughness, glass transition temperature, $T_g$, and the coating's modulus may be increased.

In general, the addition of smaller amounts of fullerenes will help to accelerate cure but will not impart undesirable hardness to the coating. Excessively high additions of fullerenes, however, will result in an undesirable increase in modulus, hardness, and crosslinlking. Functionalized fullerenes, such as hydroxylated fullerenes may be added in amounts of from 0 wt % to about 10 wt %, e.g. from about 0.1 wt % to about 5 wt %, to the single, one-pot preparation of the present oligomeric system, based upon the total weight of all components employed in the preparation of the oligomeric system.

Using as an example the situation where the reactants for preparing the oligomeric system include backbone group-providing diols, liking group-providing diisocyanates, end group-providing hydroxy-functionalized formulation components, and end group-providing hydroxy-flunctionalized radiation-curable components, the individual oligomers (a) and individual oligomers (b) of the present oligomeric system may be prepared together in a single, one-pot synthesis, so that the concentration of all N=C=O groups is equal to the concentration of all OH groups. This relationship may be generalized for any suitable reactants for preparing the present oligomeric system by maintaining the concentration of all N=C=O equivalents equal to the concentration of all OH equivalents.

In order to ensure the proper cure mechanism for the oligomeric system, the reaction stoichiometry may be controlled during the preparation of the individual oligomers so that at least 90% of the individual oligomers, based on the combined total amount of individual oligomers (a) and individual oligomers (b) in the oligomeric system, have at least one radiation-curable end-group. For example, the reaction stoichiometry may be controlled by employing a small combined amount of functionalized photoinitiator, adhesion promoter, and fullerene, and a much larger amount of functionalized radiation-curable compound.

The present coating composition does not require the addition of separate photoinitiator apart from the photoinitiator according to the present invention, i.e. the coating composition does not contain photoinitiator that is not chemically tethered to an oligomer backbone. Furthermore, coating compositions according to the present invention do not require the addition of separate adhesion promoter apart from the adhesion promoter according to the present invention, i.e. the coating composition does not contain adhesion promoter that is not chemically tethered to an oligomer backbone. In other words, the present coating composition may exclude the presence of non-reactive photoinitiator groups and non-reactive adhesion promoter groups, each of which would fail to tether itself to an oligomer backbone.

Coating compositions according to the present invention may include, in addition to the oligomeric system, only minor amounts of each of the following additives: reactive diluents, antioxidants, flow control agents, sensitizers, stabilizers, lubricants and wetting agents. The term "minor amount" is intended to mean less than 5 percent by weight, for example, less than 3 percent by weight, e.g. less than 1 percent by weight. At these low levels, the amount of each of the foregoing additives present in the coating composition may be said to be equal to the level of impurities found in commercially available raw materials. In fact, in certain embodiments of the present invention, the coating composition does not include any reactive diluent.

In other embodiments of the invention, a single reactive diluent or mixture of reactive diluents may be included in the coating composition. The use of the reactive diluent(s) allows the formulator to adjust the viscosity of the solution to improve processability if necessary. It will be readily understood by a person of ordinary skill in the art that the viscosity of the coating composition may also be lowered by elevating the application temperature by, for example, from 10 to 15° C.

The reactive diluent(s) may, for example, be a lower molecular weight, liquid acrylate-functional compound including the following diacrylates and monofunctional acrylates: tridecyl acrylate, 1,6-hexanediol diacrylate, 1,4-butanediol diacrylate, ethylene glycol diacrylate, diethylene glycol diacrylate, tetraethylene glycol diacrylate, tripropylene glycol diacrylate, neopentyl glycol diacrylate, 1,4butanediol dimethacrylate, poly(butanediol) diacrylate, tetrathylene glycol dimethacrylate, 1,3-butylene glycol diacrylate, tetraethylene glycol diacrylate, triisopropylene glycol diacrylate, triisopropylene glycol diacrylate, ethoxylated bisphenol-A diacrylate, and isobomyl acrylate. Another example of a reactive diluent is n-vinyl caprolactam.

The present radiation curable coating compositions may also be free of non- reactive diluents, such as water or organic solvents, which lack ethylenic unsaturation.

An alternative method of endcapping an acrylate or diacrylate oligomer with photoinitiator or adhesion promoter is via Michael addition. In order to run Michael addition with an acrylate or diacrylate oligomer, it is necessary to have a low molecular weight reagent as a nucleophile with an electron donating substituent like amino- (NH2), thiol- (SH) or others. Silyl substituted (with a Si—H group) low molecular weight compounds are capable of reacting with the acrylate groups of an acrylate or diacrylate oligomer in the presence of a platinum catalyst.

The foregoing coating components, including the oligomeric system, may be mixed or blended together using any known equipment, and an optical fiber may be coated with the coating composition by any known optical fiber production technique. Completion of the preparation of the oligomeric system may be determined by monitoring the disappearance of free lining group precursors, e.g. free N=C=O groups.

The techniques may involve a draw tower in which a preformed glass rod is heated to produce a thin fiber of glass. The fiber is pulled vertically through the draw tower and, along the way, the fiber passes through one or more coating stations at which various coatings are applied and cured in-line to the newly drawn fiber. The coating stations may each contain a die having an exit orifice that is sized to apply the particular coating to the fiber in a desired thickness.

Monitoring and measuring devices may be provided near each station to ensure that the coating applied at that station is coated concentrically and to the desired diameter. Examples of optical fiber coating techniques that may be utilized in the present invention include the methods disclosed in U.S. Pat. Nos. 4,512,281, 4,531,959, 4,539,219, 4,792,347, and 4,867,775.

EXAMPLES

The principal reaction in each of the following preparations of coating compositions comprising an oligomeric system according to the present invention is a reaction at elevated temperatures between diisocyanates and diols in the presence of a tin catalyst ("Sn") resulting in the formation of a urethane link.

In particular, isophorone diisocyanate (IPDI) in excess is reacted with ACCLAIM 2220N polyol (hereinafter "ACCLAIM"), available from Bayer, which is a poly(oxyalkene) glycol, ie. a polyethylene-polypropylene glycol. The molecular weight of ACCLAIM is approximately 2,500 g/mol. The tin catalyst ("Sn") used is dibutyltin dilaurate. As a flow control additive, i.e. as a surfactant to reduce surface tension, BYK 331 of BYK Chemie USA (Wallingford, Conn.) is added. The inhibitor, or antioxidant, 2,4di-tert-butyl-4-methylphenol (ionol) is also added.

The adhesion promoter UCT 7840 KG, which is an isocyanopropyltriethoxysilane available from United Chemical Technology (Bristol, PA), is added to provide adhesion promoter groups. UCT 7840 KG reacts with ACCLAIM by the isocyano group. One of the photoinitiators benzoin (a secondary alcohol), DAROCUR 1173, or 2-hydroxythioxanthen-9-one is then added to provide photoinitiator groups. Benzoin, "Sn", and IPDI are each available from Aldrich (Milwaukee, Wis.). Additional ACCLAIM is added.

The temperature is elevated and the reduction of N=C=O groups is monitored by IR (wavenumber ~2230 cm$^{-1}$).

The radiation-curable end groups are provided by SR 495, a caprolactone acrylate with hydroxyl functionality available from Sartomer (Exton, Pa.). Greater than 90% of the individual oligomers within the oligomeric system will have at least one radiation-curable end group. Additional ACCLAIM is added.

The disappearance of N=C=O groups is monitored by IR (wavenumber ~2230 cm$^{-1}$). Final formulations did not have absorption at this wavenumber.

Each of the coating compositions prepared in the examples below is a primary coating composition. It will be readily understood by one of ordinary skill in the art that secondary coating compositions may be easily prepared by a similar process using, for example, diols of a smaller molecular weight or a higher functionality. Adhesion promoter is typically not employed in the preparation of a secondary coating.

Example 1

The coating composition of Example 1 was prepared from the following components in the following total amounts:

| | |
|---|---|
| IPDI | 72 g |
| Ionol | 0.5 g |
| Benzoin | 25 g |
| "Sn" | 1.8 g |
| ACCLAIM | 258 g |
| UCT 7840 KG | 2.0 g |
| SR495 | 95 g |
| BYK331 | 0.1 g |

The final coating composition had the following properties. The molecular weight was 5,400 g/mol. The molecular weight distribution, $P_d$, was 1.1. The viscosity $\eta_0$ was 24,850 cP at 30° C. and 6,890 cP at 45° C. The elongation prior to break was 72%, the tensile modulus was 2.3 MPa, and the glass transition temperature $T_g$ was −8° C. Finally, the glass adhesion of the formulation was 0.18±0.03 N.

It should be noted that the coating composition of Example 1 did not include any reactive diluent. Although the coating composition of Example 1 is more viscous than the typical primary coating composition, the higher viscosity may be overcome by applying the coating composition at a temperature of from 10 to 20° C. higher than the normal application temperature of coatings for optical fiber (40–50° C.).

Example 2

The coating composition of Example 2 was prepared from the following components in the following total amounts:

| | |
|---|---|
| IPDI | 48 g |
| Ionol | 0.4 g |
| Benzoin | 17 g |
| "Sn" | 1.3 g |
| ACCLAIM | 200 g |
| SR495 | 58 g |
| BYK331 | 0.05 g |

The final coating composition had the following properties. The molecular weight was 8,040 g/mol. The molecular weight distribution, $P_d$, was 1.2. The viscosity $\eta_0$ was 36,250 cP at 30° C. and 10,700 cP at 40° C. The elongation prior to break was 105%, the tensile modulus was 1.0 MPa, and the glass transition temperature $T_g$ was −26° C. Finally, the glass adhesion of the formulation was 0.27±0.02 N.

Example 3

The coating composition of Example 3 was prepared from the following components in the following total amounts:

| | |
|---|---|
| IPDI | 72 g |
| Ionol | 0.5 g |
| Benzoin | 25 g |
| "Sn" | 1.8 g |
| ACCLAIM | 314 g |
| UCT 7840 KG | 2.0 g |
| SR495 | 60 g |
| BYK331 | 0.1 g |

The final coating composition had the following properties. The molecular weight was 8,800 g/mol. The molecular weight distribution, $P_d$, was 1.3. The viscosity $\eta_0$ was 119,000 cP at 25° C. and 19,250 cP at 45° C. The elongation prior to break was 113%, the tensile modulus was 0.6 MPa, and the glass transition temperature $T_g$ was −27° C.

Example 4

The coating composition of Example 4 was prepared from the following components in the following total amounts:

| | |
|---|---|
| IPDI | 72 g |
| Ionol | 1.0 g |
| Benzoin | 25 g |
| "Sn" | 1.8 g |
| ACCLAIM | 298 g |
| UCT 7840 KG | 2.0 g |
| SR495 | 82 g |
| BYK331 | 0.1 g |

The final coating composition had the following properties. The molecular weight was 5,040 g/mol. The molecular weight distribution, $P_d$, was 1.1. The viscosity $\eta_0$ was 31,900 cP at 30° C. and 8,875 cP at 45° C. The elongation prior to break was 86%, the tensile modulus was 1.7 MPa, and the glass transition temperature $T_g$ was −18° C. The glass adhesion of the formulation was 0.32±0.02 N.

Example 5

The coating composition of Example 5 was prepared from the following components in the following total amounts:

| | |
|---|---|
| IPDI | 72 g |
| Ionol | 0.5 g |
| DAROCUR 1173 | 20 g |
| "Sn" | 1.5 g |
| ACCLAIM | 258 g |
| SR506 | 70 g |
| UCT 7840 KG | 2.5 g |
| SR495 | 115 g |
| BYK331 | 0.1 g |

The final coating composition, which included the reactive diluent SR506, had the following properties. The molecular weight was 4,030 g/mol. The molecular weight distribution, $P_d$, was 1.3. The viscosity $\eta_0$ was 4,900 cP at 25° C. and 1,560 cP at 45° C. The elongation prior to break was 63%, the tensile modulus was 1.4 MPa, and the glass transition temperature Tg was −6° C. The glass adhesion of the formulation was 0.19±0.02 N.

Example 6

The coating composition of Example 6 was prepared from the following components in the following total amounts:

| | |
|---|---|
| IPDI | 72 g |
| Ionol | 1.0 g |
| DAROCUR 1173 | 20 g |
| "Sn" | 1.8 g |
| ACCLAIM | 359 g |
| UCT 7840 KG | 2.0 g |
| SR495 | 115 g |
| BYK331 | 0.2 g |

The final coating composition had the following properties. The molecular weight was 5,960 g/mol. The molecular weight distribution, $P_d$, was 1.3. The viscosity $\eta_0$ was 19,500 cP at 30° C. and 5,300 cP at 45° C. The elongation prior to break was 80%, the tensile modulus was 0.8 MPa, and the glass transition temperature $T_g$ was −27° C. Finally, the glass adhesion of the formulation was 0.1±0.05 N.

Example 7

The coating composition of Example 7 was prepared from the following components in the following total amounts:

| | |
|---|---|
| IPDI | 72 g |
| Ionol | 1.0 g |
| 2-hydroxythioxanthen-9-one | 1.0 g |
| "Sn" | 1.8 g |
| ACCLAIM | 353 g |
| UCT 7840 KG | 3.0 g |
| SR495 | 115 g |
| BYK331 | 0.2 g |

The final coating composition had the following properties. The molecular weight was 4,600 g/mol. The molecular weight distribution, Pd, was 1.1. The viscosity $\eta_0$ was 12,850 cP at 30° C. and 4,950 cP at 45 ° C. The elongation prior to break was 57%, the tensile modulus was 1.4 MPa, and the glass transition temperature $T_g$ was −40° C. Finally, the glass adhesion of the formulation was 0.0±0.04 N.

Comparative Example 1

In order to reveal the efficiency of employing an oligomeric system comprising individual oligomers having a photoinitiator chemically bound thereto, the coating composition of Comparative Example 1 was prepared from the following components in the following total amounts:

| | |
|---|---|
| IPDI | 72 g |
| Ionol | 1.0 g |
| i-PrOH | 7.0 g |
| "Sn" | 1.8 g |
| ACCLAIM | 298 g |
| UCT 7840 KG | 2.0 g |
| SR495 | 82 g |
| BYK331 | 0.1 g |
| Benzoin | 25 g |

It must be noted that the coating composition of Comparative Example 1 is nearly identical to the coating composition of Example 4 in terms of components, component amounts, and preparation steps, except that in the composition of Comparative Example 1, the 25 g of benzoin was added to the composition as separate photoinitiator outside and apart from the preparation of the oligomeric system. In other words, the 25 g of benzoin in Comparative Example 1 was dissolved in the coating composition after the preparation of the oligomeric system, i.e. after free N=C=O groups were no longer available as monitored by IR (wavenumber 2230 cm$^{-1}$).

During the preparation of the oligomeric system in Comparative Example 1, the secondary alcohol, propan-2-ol (i-PrOH, available from Aldrich), was used in a molar amount equal to the molar amount of benzoin used in Example 4.

The filial coating composition had the following properties. The molecular weight was 6,500 g/mol. The molecular weight distribution, $P_d$, was 1.1. The viscosity $\eta_0$ was 38,400 cP at 30° C. and 10,700 cP at 45° C. The elongation prior to break was 90%, the tensile modulus was 1.1 MPa, and the glass transition temperature $T_g$ was −15° C. Finally, the glass adhesion of the formulation was 0.29±0.03 N.

Kinetics of Cure

The coating compositions of Examples 1–4 and 6–7 do not comprise reactive diluents, and therefore contain relatively small amounts of polymerizable acrylic groups compared to conventional formulations described in the prior art or available commercially.

The kinetics of cure for the coating compositions of Examples 1–3 were measured by photoDSC and by RT IR. In the photoDSC experiments, a Perkin Elmer (Norwalk, Conn.) photoDSC DPA-7 was employed to measure the heat produced during coating cure. An Osram Hg short arc 100 W lamp was used as the light source. Samples on a DSC pan were flushed with nitrogen for 10 min prior to irradiation. Light intensity was 40 W/cm² on a pan. Samples were irradiated with two light pulses with a duration of 0.6 s each, the time interval between pulses was 30 s, and experiments were done at 40° C. The percent of conversion was determined as a fraction of heat in percent released during the first pulse of the total heat released during two pulses. The higher is the percentage of conversion, the faster is the cure.

The following rather high values were obtained for acrylate conversion of Example coating compositions 1–3 during the first light pulse. These values were 89.8, 85.3, and 85.4%, respectively. These values were close to or higher than similar values obtained for a commercially available primary coating studied under the same conditions.

The kinetics of cure for the coating compositions of Examples 1–4 and 6–7 were also measured by the real-time FT IR technique, which measures the disappearance upon UV-irradiation of twisting vibration bank of acrylate group at 810 cm⁻¹. A Nicolet 870 FT IR device from Nicolet (Madison, Wis. in ATR regime, MCT/A detector was used. The thickness of each sample coating composition on top of a crystal was 100 μm. Irradiation was provided by a full light of UV-spot light source Lighting cure 200 of Hamamatsu (Bridgewater, N.J.). The light intensity on the surface of each sample was 20 mW/cm². The kinetics for each coating composition of Examples 1–4 and 6–7 were found to satisfactory follow first-order law. A kinetics simulation with IgorPro software allowed to get a first order rate constant of cure k, s⁻¹.

FIG. 1 is a graph comparing (i) kinetic traces measured by IR of cure of the coating composition of Example 4 (the curves labeled (a)), wherein the photoinitiator benzoin is chemically tethered to individual oligomers of the oligomeric system, and (ii) kinetics traces measured by IR of cure of the coating composition of Comparative Example 1 (the curves labeled (b)), wherein the photoinitiator benzoin is merely added to the coating composition after the preparation of the oligomeric system, ie. after the disappearance of free N=C=O groups in the oligomeric system. FIG. 1 demonstrates that the coating composition of Example 4 cures faster than the coating composition of Comparative Example 1, under identical conditions of irradiation with a weak light intensity. In fact, a first order rate constant of k=0.65±0.10 s⁻¹ was obtained for the coating composition of Example 4, whereas a first order rate constant of k=0.13±0.02 s⁻¹ was obtained for the coating composition of Comparative Example 1.

Finally, radiation-curable optical fiber coating compositions comprising an oligomeric system, wherein individual oligomers of the oligomeric system have formulation components of the coating composition chemically tethered thereto, tend to have better rheology, i.e. a larger Newtonian plateau for viscosity vs. shear rate.

What is claimed is:

1. A radiation-curable coating composition for optical fibers comprising an oligomeric system comprising (a) individual oligomers that each comprise an oligomeric backbone having chemically tethered thereto one or more radiation-curable groups and (b) individual oligomers that each comprise an oligomeric backbone having chemically tethered thereto one or more formulation components of a radiation-curable coating composition, wherein each individual oligomer of the group of individual oligomers (a) may be the same as or different from each individual oligomer of the group of individual oligomers (b), and each formulation component is selected from the group consisting of a photoinitiator group, an adhesion promoter group, and a fullerene, wherein at least one formulation component is a photoinitiator group or a fullerene, or more than one formulation component are adhesion promoter groups.

2. The radiation-curable coating composition of claim 1, wherein each individual oligomer of the group of individual oligomers (a) and each individual oligomer of the group of individual oligomers (b) comprises (i) at least one backbone group, (ii) at least two linking groups, and (iii) at least two end groups.

3. The radiation-curable coating composition of claim 2, wherein each individual oligomer of the group of individual oligomers (a) and each individual oligomer of the group of individual oligomers (b) is independently represented by the following structure:

$$X^1\text{-}A^1\text{-}(R\text{-}A^2)_n\text{-}X^2$$

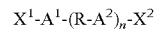

wherein $X^1$ and $X^2$ are end groups, which may be the same or different, $A^1$ and $A^2$ are linking groups, which may be the same or different, R is a backbone group $n \geq 1$, and the end groups $X^1$ and $X^2$ are independently selected from the group consisting of a photoinitiator group, an adhesion promoter group, a radiation-curable end group, and a fullerene, provided that, in the case of an individual oligomer of the group of individual oligomers (a), at least one of end groups $X^1$ and $X^2$ is a radiation-curable group, and in the case of an individual oligomer of the group of individual oligomers (b), at least one of end groups $X^1$ and $X^2$ is selected from the group consisting of photoinitiator group and fullerene, both of end groups $X^1$ and $X^2$ are adhesion promoter groups.

4. The radiation-curable coating composition of claim 3, wherein at least 90% of the individual oligomers, based on the combined total amount of individual oligomers (a) and individual oligomers (b) in the oligomeric system, contain, as the end groups $X^1$ and $X^2$, at least one radiation-curable group.

5. The radiation-curable coating composition of claim 3, wherein at most 10% of the individual oligomers, based on the combined total amount of individual oligomers (a) and individual oligomers (b) in the oligomeric system, contain, as the end groups $X^1$ and $X^2$, a photoinitiator group and an adhesion promoter group, two photoinitiator groups, two adhesion promoter groups, or a fullerene group and either a photoinitiator group or an adhesion promoter group.

6. The radiation-curable coating composition of claim 3, wherein each individual oligomer of the group of individual oligomers (a) and each individual oligomer of the group of individual oligomers (b) is the reaction product of (i) at least one polyhydroxy functionalized compound that reacts to provide the backbone group R, (ii) at least one diisocyanate, and (iii) at least one hydroxy-, thiol-, amino-, or isocyano-functionalized compound that reacts to provide the end groups $X^1$ and $X^2$.

7. The radiation-curable coating composition of claim 6, wherein the at least one diisocyanate is selected from the group consisting of toluene diisocyanate and isophorone diisocyanate.

8. The radiation-curable coating composition of claim 6, wherein the at least one polyhydroxy functionalized compound that reacts to provide the backbone group R is a diol selected from the group consisting of polyether diols, polyester diols, polycarbonate diols, hydrocarbon diols, and mixtures thereof.

9. The radiation-curable coating composition of claim 8, wherein the diol is a polyethylene-polypropylene glycol.

10. The radiation-curable coating composition of claim 3, wherein n is on average from about 2 to about 25.

11. The radiation-curable coating composition of claim 3, wherein the linking groups $A^1$ and $A^2$ are urethane linking groups.

12. The radiation-curable coating composition of claim 3, wherein a photoinitiator reacts to provide the photoinitiator group, and the photoinitiator is selected from the group consisting of benzoin, 1-hydroxycyclohexyl phenyl ketone, 2-hydroxy-2-methyl-1-phenyl propan-1-one, 1-{4-(2-hydroxyethoxy)phenyl}-2-hydroxy-2-methylpropan-1-one, and 2-hydroxythioxanthen-9-one.

13. The radiation-curable coating composition of claim 3, wherein an adhesion promoter reacts to provide the adhesion promoter group, and the adhesion promoter is an hydroxy-, thiol-, amino-, or isocyano-functionalized dialkoxysilane or an hydroxy-, thiol-, amino-, or isocyano-functionalized trialkoxysilane.

14. The radiation-curable coating composition of claim 13, wherein the adhesion promoter is selected from the group consisting of N-beta(aminoethyl)-gamma-aminopropylmethyldimethoxysilane, N-beta(aminoethyl)-gamma-aminopropyltrimethoxysilane, and isocyanopropyltriethoxysilane.

15. The radiation-curable coating composition of claim 3, wherein a radiation-curable compound reacts to provide the radiation-curable group, and the radiation-curable compound is selected from the group consisting of 2-hydroxyethyl (meth)acrylate, 2-hydroxypropyl (meth)acrylate, 2-hydroxybutyl (meth)acrylate, 4-hydroxybutyl (meth)acrylate, pentanediol mono(meth)acrylate, 2-hydroxy-3-phenyloxypropyl (meth)acrylate, 2-hydroxyalkyl(meth)acryloyl phosphate, 4-hydroxycyclohexyl (meth)acrylate, cyclohexanedimethanol mono(meth)acrylate, neopentyl glycol mono (meth)acrylate, trimethylolpropane di(meth)acrylate, and pentaerythritol tri(meth)acrylate.

16. The radiation-curable coating composition of claim 1, wherein the coating composition does not contain photoinitiator that is not chemically tethered to an oligomer backbone.

17. The radiation-curable coating composition of claim 1, wherein the coating composition does not contain adhesion promoter that is not chemically tethered to an oligomer backbone.

18. The radiation-curable coating composition of claim 17, wherein the coating composition comprises each of reactive diluent(s), antioxidant(s), flow control agent(s), sensitizer(s), stabilizer(s), lubricant(s) and wetting agent(s) in amounts of 5 wt % or less, based on the total weight of the coating composition.

19. The radiation-curable coating composition of claim 18, wherein the coating composition comprises each of reactive diluent(s), antioxidant(s), flow control agent(s), sensitizer(s), stabilizer(s), lubricant(s) and wetting agent(s) in amounts of 3 wt % or less, based on the total weight of the coating composition.

20. The radiation-curable coating composition of claim 1, wherein the coating composition does not contain a reactive diluent(s).

21. A coated optical fiber, comprising an optical fiber having coated thereon a radiation-curable coating composition for optical fibers comprising an oligomeric system comprising (a) individual oligomers that each comprise an oligomeric backbone having chemically tethered thereto one or more radiation-curable groups and (b) individual oligomers that each comprise an oligomeric backbone having chemically tethered thereto one or more formulation components of a radiation-curable coating composition, wherein each individual oligomer of the group of individual oligomers (a) may be the same as or different from each individual oligomer of the group of individual oligomers (b), and each formulation component is selected from the group consisting of a photoinitiator group, an adhesion promoter group, and a fullerene, wherein at least one formulation component is a photoinitiator group or a fullerene, or more than one formulation component are adhesion promoter groups.

22. The coated optical fiber of claim 21, wherein each individual oligomer of the group of individual oligomers (a) and each individual oligomer of the group of individual oligomers (b) comprises (i) at least one backbone group, (ii) at least two linking groups, and (iii) at least two end groups.

23. The coated optical fiber of claim 22, wherein each individual oligomer of the group of individual oligomers (a) and each individual oligomer of the group of individual oligomers (b) is independently represented by the following structure:

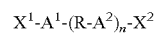

wherein $X^1$ and $X^2$ are end groups, which may be the same or different, $A^1$ and $A^2$ are linking groups, which may be the same or different, R is a backbone group $n \geq 1$, and the end groups $X^1$ and $X^2$ are independently selected from the group consisting of a photoinitiator group, an adhesion promoter group, a radiation-curable end group, and a fullerene, provided that, in the case of an individual oligomer of the group of individual oligomers (a), at least one of end groups $X^1$ and $X^2$ is a radiation-curable group, and in the case of an individual oligomer of the group of individual oligomers (b), at least one of end groups $X^1$ and $X^2$ is selected from the group consisting of a photoinitiator group and a fullerene, or both of end groups $X^1$ and $X^2$ are adhesion promoter groups.

24. The coated optical fiber of claim 23, wherein at least 90% of the individual oligomers, based on the combined total amount of individual oligomers (a) and individual oligomers (b) in the oligomeric system, contain, as the end groups $X^1$ and $X^2$, at least one radiation-curable group.

25. The coated optical fiber of claim 23, wherein at most 10% of the individual oligomers, based on the combined total amount of individual oligomers (a) and individual oligomers (b) in the oligomeric system, contain, as the end groups $X^1$ and $X^2$, a photoinitiator group and an adhesion promoter group, two photoinitiator groups, two adhesion promoter groups, or a fullerene group and either a photoinitiator group or an adhesion promoter group.

26. The coated optical fiber of claim 23, wherein each individual oligomer of the group of individual oligomers (a)

and each individual oligomer of the group of individual oligomers (b) is the reaction product of (i) at least one polyhydroxy functionalized compound that reacts to provide the backbone group R, (ii) at least one diisocyanate, and (iii) at least one hydroxy-, thiol-, amino-, or isocyano-functionalized compound that reacts to provide the end groups $X^1$ and $X^2$.

27. The coated optical fiber of claim 26, wherein the at least one diisocyanate is selected from the group consisting of toluene diisocyanate and isophorone diisocyanate.

28. The coated optical fiber of claim 26, wherein the at least one polyhydroxy functionalized compound that reacts to provide the backbone group R is a diol selected from the group consisting of polyether diols, polyester diols, polycarbonate diols, hydrocarbon diols, and mixtures thereof.

29. The coated optical fiber of claim 28, wherein the diol is a polyethylene-polypropylene glycol.

30. The coated optical fiber of claim 23, wherein n is on average from about 2 to about 25.

31. The coated optical fiber of claim 23, wherein the linking groups A1 and A2 are urethane linking groups.

32. The coated optical fiber of claim 23, wherein a photoinitiator reacts to provide the photoinitiator group, and the photoinitiator is selected from the group consisting of benzoin, 1-hydroxycyclohexyl phenyl ketone, 2-hydroxy-2-methyl-1-phenyl propan-1-one, 1-{4-(2-hydroxyethoxy)phenyl}-2-hydroxy-2-methylpropan-1-one, and 2-hydroxythioxanthen-9-one.

33. The coated optical fiber of claim 23, wherein an adhesion promoter reacts to provide the adhesion promoter group, and the adhesion promoter is an hydroxy-, thiol-, amino-, or isocyano-functionalized dialkoxysilane or an hydroxy-, thiol-, amino-, or isocyano- functionalized trialkoxysilane.

34. The coated optical fiber of claim 33, wherein the adhesion promoter is selected from the group consisting of N-beta(aminoethyl)-gamma-aminopropylmethyldimethoxysilane, N-beta(aminoethyl)-gamma-aminopropyltrimethoxysilane, and isocyanopropyltriethoxysilane.

35. The coated optical fiber of claim 23, wherein a radiation-curable compound reacts to provide the radiation-curable group, and the radiation-curable compound is selected from the group consisting of 2-hydroxyethyl (meth)acrylate, 2-hydroxypropyl (meth)acrylate, 2-hydroxybutyl (meth)acrylate, 4-hydroxybutyl (meth)acrylate, pentanediol mono(meth)acrylate, 2-hydroxy-3-phenyloxypropyl (meth)acrylate, 2-hydroxyalkyl(meth)acryloyl phosphate, 4-hydroxycyclohexyl (meth)acrylate, cyclohexanedimethanol mono(meth)acrylate, neopentyl glycol mono(meth)acrylate, trimethylolpropane di(meth)acrylate, and pentaerythritol tri(meth)acrylate.

36. The coated optical fiber of claim 21, wherein the coating composition does not contain photoinitiator that is not chemically tethered to an oligomer backbone.

37. The coated optical fiber of claim 21, wherein the coating composition does not contain adhesion promoter that is not chemically tethered to an oligomer backbone.

38. The coated optical fiber of claim 37, wherein the coating composition comprises each of reactive diluent(s), antioxidant(s), flow control agent(s), sensitizer(s), stabilizer(s), lubricant(s) and wetting agent(s) in amounts of 5 wt % or less, based on the total weight of the coating composition.

39. The coated optical fiber of claim 38, wherein the coating composition comprises each of reactive diluent(s), antioxidant(s), flow control agent(s), sensitizer(s), stabilizer(s), lubricant(s) and wetting agent(s) in amounts of 3 wt % or less, based on the total weight of the coating composition.

40. The coated optical fiber of claim 21, wherein the coating composition does not contain a reactive diluent(s).

41. A telecommunications cable, comprising a glass optical fiber having coated thereon a radiation-curable coating composition for optical fibers comprising an oligomeric system comprising (a) individual oligomers that each comprise an oligomeric backbone having chemically tethered thereto one or more radiation-curable groups and (b) individual oligomers that each comprise an oligomeric backbone having chemically tethered thereto one or more formulation components of a radiation-curable coating composition, wherein each individual oligomer of the group of individual oligomers (a) may be the same as or different from each individual oligomer of the group of individual oligomers (b), and each formulation component is selected from the group consisting of a photoinitiator group, an adhesion promoter group, and a fullerene, wherein at least one formulation component is a photoinitiator group or a fullerene, or more than one formulation component are adhesion promoter groups.

42. The telecommunications cable of claim 41, wherein each individual oligomer of the group of individual oligomers (a) and each individual oligomer of the group of individual oligomers (b) comprises (i) at least one backbone group, (ii) at least two linking groups, and (iii) at least two end groups.

43. The telecommunications cable of claim 42, wherein each individual oligomer of the group of individual oligomers (a) and each individual oligomer of the group of individual oligomers (b) is independently represented by the following structure:

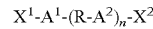

wherein $X^1$ and $X^2$ are end groups, which may be the same or different, A1 and A2 are linking groups, which may be the same or different, R is a backbone group $n \geq 1$, and the end groups $X^1$ and $X^2$ are independently selected from the group consisting of a photoinitiator group, an adhesion promoter group, a radiation-curable end group, and a fullerene, provided that, in the case of an individual oligomer of the group of individual oligomers (a), at least one of end groups X1 and X2 is a radiation-curable group, and in the case of an individual oligomer of the group of individual oligomers (b), at least one of end groups $X^1$ and $X^2$ is selected from the group consisting of a photoinitiator group and a fullerene, or both of end groups $X^1$ and $X^2$ are adhesion promoter groups.

44. The telecommunications cable of claim 43, wherein at least 90% of the individual oligomers, based on the combined total amount of individual oligomers (a) and individual oligomers (b) in the oligomeric system, contain, as the end groups $X^1$ and $X^2$, at least one radiation-curable group.

45. The telecommunications cable of claim 43, wherein at most 10% of the individual oligomers, based on the combined total amount of individual oligomers (a) and individual oligomers (b) in the oligomeric system, contain, as the end groups $X^1$ and $X^2$, a photoinitiator group and an adhesion promoter group, two photoinitiator groups, two adhesion promoter groups, or a fullerene group and either a photoinitiator group or an adhesion promoter group.

46. The telecommunications cable of claim 43, wherein each individual oligomer of the group of individual oligomers (a) and each individual oligomer of the group of individual oligomers (b) is the reaction product of (i) at least one polyhydroxy functionalized compound that reacts to provide the backbone group R, (ii) at least one diisocyanate, and (iii) at least one hydroxy-, thiol-, amino-, or isocyano-functionalized compound that reacts to provide the end groups $X^1$ and $X^2$.

47. The telecommunications cable of claim 46, wherein the at least one diisocyanate is selected from the group consisting of toluene diisocyanate and isophorone diisocyanate.

48. The telecommunications cable of claim 46, wherein the at least one polyhydroxy functionalized compound that reacts to provide the backbone group R is a diol selected from the group consisting of polyether diols, polyester diols, polycarbonate diols, hydrocarbon diols, and mixtures thereof.

49. The telecommunications cable of claim 48, wherein the diol is a polyethylene-polypropylene glycol.

50. The telecommunications cable of claim 43, wherein n is on average from about 2 to about 25.

51. The telecommunications cable of claim 43, wherein the linking groups $A^1$ and $A^2$ are urethane linking groups.

52. The telecommunications cable of claim 43, wherein a photoiitiator reacts to provide the photoinitiator group, and the photoinitiator is selected from the group consisting of benzoin, 1-hydroxycyclohexyl phenyl ketone, 2-hydroxy-2-methyl-1-phenyl propan-1-one, 1-{4-(2-hydroxyethoxy)phenyl}-2-hydroxy-2-methylpropan-1-one, and 2 hydroxythioxanthen-9-one.

53. The telecommunications cable of claim 43, wherein an adhesion promoter reacts to provide the adhesion promoter group, and the adhesion promoter is an hydroxy-, thiol-, amino-, or isocyano-functionalized dialkoxysilane or an hydroxy-, thiol-, amino-, or isocyano-functionalized trialkoxysilane.

54. The telecommunications cable of claim 53, wherein the adhesion promoter is selected from the group consisting of N-beta(aminoethyl)-gamma-aminopropylmethyldimethoxysilane, N-beta(aminoethyl)-gamma-aminopropyltrimethoxysilane, and isocyanopropyltriethoxysilane.

55. The telecommunications cable of claim 43, wherein a radiation-curable compound reacts to provide the radiation-curable group, and the radiation-curable compound is selected from the group consisting of 2-hydroxyethyl (meth)acrylate, 2-hydroxypropyl (meth)acrylate, 2-hydroxybutyl (meth)acrylate, 4-hydroxybutyl (meth)acrylate, pentanediol mono(meth)acrylate, 2-hydroxy-3-phenyloxypropyl (meth)acrylate, 2-hydroxyalkyl(meth)acryloyl phosphate, 4-hydroxycyclohexyl (meth)acrylate, cyclohexanedimethanol mono(meth)acrylate, neopentyl glycol mono(meth)acrylate, trimethylolpropane di(meth)acrylate, and pentaerythritol tri (meth)acrylate.

56. The telecommunications cable of claim 41, wherein the coating composition does not contain photoinitiator that is not chemically tethered to an oligomer backbone.

57. The telecommunications cable of claim 41, wherein the coating composition does not contain adhesion promoter that is not chemically tethered to an oligomer backbone.

58. The telecommunications cable of claim 57, wherein the coating composition comprises each of reactive diluent(s), antioxidant(s), flow control agent(s), sensitizer(s), stabilizer(s), lubricant(s) and wetting agent(s) in amounts of 5 wt % or less, based on the total weight of the coating composition.

59. The telecommunications cable of claim 58, wherein the coating composition comprises each of reactive diluent(s), antioxidant(s), flow control agent(s), sensitizer(s), stabilizer(s), lubricant(s) and wetting agent(s) in amounts of 3 wt % or less, based on the total weight of the coating composition.

60. The telecommunications cable of claim 41, wherein the coating composition does not contain a reactive diluent(s).

* * * * *